United States Patent
Miller et al.

(10) Patent No.: US 10,023,195 B2
(45) Date of Patent: Jul. 17, 2018

(54) POWERTRAIN OPERATION AND REGULATION

(71) Applicant: Caterpillar Inc., Peoria, IL (US)

(72) Inventors: Peter J. Miller, Brookfield, WI (US); Omar Abdel-Baqi, Oak Creek, WI (US)

(73) Assignee: Caterpillar Inc., Deerfield, IL (US)

( * ) Notice: Subject to any disclaimer, the term of this patent is extended or adjusted under 35 U.S.C. 154(b) by 100 days.

(21) Appl. No.: 15/234,695

(22) Filed: Aug. 11, 2016

(65) Prior Publication Data

US 2018/0043894 A1 Feb. 15, 2018

(51) Int. Cl.
  *B60W 30/188* (2012.01)
  *B60W 20/13* (2016.01)
  *B60K 6/46* (2007.10)
  *B60W 10/06* (2006.01)
  *B60W 10/08* (2006.01)
  *B60W 10/26* (2006.01)
  (Continued)

(52) U.S. Cl.
  CPC .......... *B60W 30/1884* (2013.01); *B60K 6/46* (2013.01); *B60W 10/06* (2013.01); *B60W 10/08* (2013.01); *B60W 10/26* (2013.01); *B60W 20/13* (2016.01); *E02F 3/30* (2013.01); *E02F 9/2075* (2013.01); *B60W 2300/17* (2013.01); *B60W 2510/0638* (2013.01); *B60W 2510/0657* (2013.01); *B60W 2510/244* (2013.01); *B60W 2710/0644* (2013.01); *B60Y 2200/92* (2013.01); *B60Y 2300/1884* (2013.01); *Y10S 903/93* (2013.01)

(58) Field of Classification Search
  CPC ...... B60W 10/06; B60W 20/00; B60W 20/40; B60W 2710/083; B60W 30/188; B60W 40/13; B60W 2510/0638; B60W 2510/0657; B60K 17/105; B60K 2006/268; B60K 6/24; B60K 6/26; Y10S 903/906; Y10S 903/905; B60L 2240/26; B60L 2240/423; B60L 11/14
  USPC .............. 701/22; 180/65.285, 65.21, 65.265; 903/902, 903, 916; 290/40 A, 40 R
  See application file for complete search history.

(56) References Cited

U.S. PATENT DOCUMENTS

| | | |
|---|---|---|
| 6,959,241 B2 | 10/2005 | Itow et al. |
| 7,069,673 B2 | 7/2006 | Kagoshima et al. |
| 7,565,801 B2 | 7/2009 | Tozawa et al. |

(Continued)

FOREIGN PATENT DOCUMENTS

| | | |
|---|---|---|
| JP | 2005-273262 A | 10/2005 |
| WO | WO 2015/099329 A1 | 7/2015 |

*Primary Examiner* — Dalena Tran
(74) *Attorney, Agent, or Firm* — Leydig, Voit & Mayer, Ltd.

(57) ABSTRACT

One or more powertrains can include a motor-generator disposed therein that is electrically coupled to an energy storage device through an inverter gate. A regulation strategy can monitor operation of the powertrain to regulate the inverter gate to selectively discharge energy from the energy storage device to the motor-generator to assist the powertrain or to charge energy from the motor-generator to the energy storage device for future use. In an aspect, the regulation strategy may maintain a consistent speed of an internal combustion engine associated with the powertrain. In another aspect, the regulation strategy may regulate simultaneous operation of first and second powertrains disposed a parallel relation.

15 Claims, 6 Drawing Sheets

(51) Int. Cl.
*E02F 3/30* (2006.01)
*E02F 9/20* (2006.01)

(56) References Cited

U.S. PATENT DOCUMENTS

| | | | |
|---|---|---|---|
| 7,949,442 B2 | 5/2011 | Sheidler et al. | |
| 8,036,797 B2* | 10/2011 | Johnson | E02F 9/2029 37/347 |
| 8,190,334 B2 | 5/2012 | Kagoshima et al. | |
| 8,448,731 B2* | 5/2013 | Heap | B60W 20/15 180/65.275 |
| 8,489,293 B2* | 7/2013 | Heap | B60W 20/11 477/120 |
| 8,909,434 B2 | 12/2014 | Anders et al. | |
| 9,187,294 B2 | 11/2015 | Sakamoto et al. | |
| 9,248,731 B2 | 2/2016 | Soma' et al. | |
| 2012/0246981 A1 | 10/2012 | Magaki et al. | |
| 2014/0148984 A1 | 5/2014 | Nishi et al. | |
| 2015/0090506 A1 | 4/2015 | Hirozawa | |

* cited by examiner

POWERTRAIN OPERATION AND REGULATION

TECHNICAL FIELD

This patent disclosure relates generally to regulating operation of one or more powertrains in a machine and, more particular, to selectively converting and utilizing kinetic energy and potential energy stored in an energy storage device to operate the powertrains.

BACKGROUND

A machine such as a construction or mining machine typically has a powertrain that includes the components that transmit and adjust the power or energy output from the prime mover, such as an internal combustion engine, to the point of utilization such as propelling the machine or operating implements associated with the machine. Powertrain components can include drive shafts, transmissions, differentials, power takeoffs, and other components that are responsible for operation of the machine. The prime mover is the source or origin of the kinetic or mechanical energy transmitted through these components. An internal combustion engine, for example, can combust a hydrocarbon-based fuel to convert the chemical energy therein to kinetic energy or mechanical power embodied as the rotational motion of a driveshaft. While traditional machines included a single prime mover as the source of energy, more recent hybrid designs may combine different technologies to provide complementary sources of energy for the machine in order to improve efficiency and prolong machine life.

One common hybrid technology is regenerative braking in which the powertrain is configured to slow or stop the motion of the machine, or the moving implements of the machine, by capturing and storing the kinetic energy associated with the motion. Regenerative braking can therefore recover some of the applied braking power of the machine for reuse rather than dissipating the power through friction and heat generation. In a hydraulic hybrid design, the captured energy can be stored in the form of pressurized fluid in an accumulator that can later be reapplied as kinetic energy in the powertrain. An alternative design for a hybrid powertrain is an electric hybrid system in which the captured energy is stored as electrical power in batteries or capacitors for further use such as to power electric motors associated with the machine. U.S. Pat. No. 7,565,801 describes a machine, such as an excavator, which includes variations of a hydraulic hybrid system and an electric hybrid system to capture and reuse kinetic energy associated the operation of the excavator. The present disclosure is similarly directed to recovering and reusing the energy transmitted through one or more powertrains associated with a machine such as an excavator.

SUMMARY

The disclosure describes, in one aspect, method of regulating operation of a powertrain having an internal combustion engine, a motor-generator, and a powertrain load coupled together in series. The method begins by operating the internal combustion engine at a first engine speed. An energy storage device is electrically connected to a motor-generator and can be charged through an inverter gate with electrical energy from the motor-generator. The method may register a change in the powertrain load and determine if the change represents a torque change condition or a speed change condition. If the change represents a torque change condition, the method operates the inverter gate to maintain the first engine speed. If the change represents a speed change condition, the method operates the inverter gate to accelerate the internal combustion engine to a second engine speed.

In another aspect, the disclosure describes a powertrain for a machine having an internal combustion engine operable at a plurality of engine speeds and a motor-generator physically coupled in series to the internal combustion engine. The motor-generator capable of operating as either a motor or a generator. A powertrain load is physically coupled in series to the motor-generator and the internal combustion engine. To store energy, an energy storage device is electrically coupled to the motor-generator through an inverter gate. To control operation of the powertrain, a controller communicating with the inverter gate is programmed to register a change in the powertrain load and to determine if the change represents a torque change condition or a speed change condition. The controller is further programmed to operate the inverter gate to maintain a first engine speed of the internal combustion engine under the torque change condition and to accelerate the internal combustion engine under the speed change condition.

In yet a further aspect, the disclosure describes a method of regulating operation of a machine having a first powertrain and a second powertrain arranged in parallel. The method calculates the total power requirement of the machine based upon various inputs. The method divides the total power requirement between the first powertrain and the second powertrain to determine a first request signal and a second request signal. The first request signal is converted to a first torque signal and the second request signal is converted to a second torque signal. The method use the first torque signal to determine a direction of energy flow between a first energy storage device electrically coupled to a first motor-generator of the first powertrain and uses the second torque signal to determine a direction of energy flow between a second energy storage device electrically coupled to a second motor-generator of the second powertrain.

DETAILED DESCRIPTION

Figure 1:
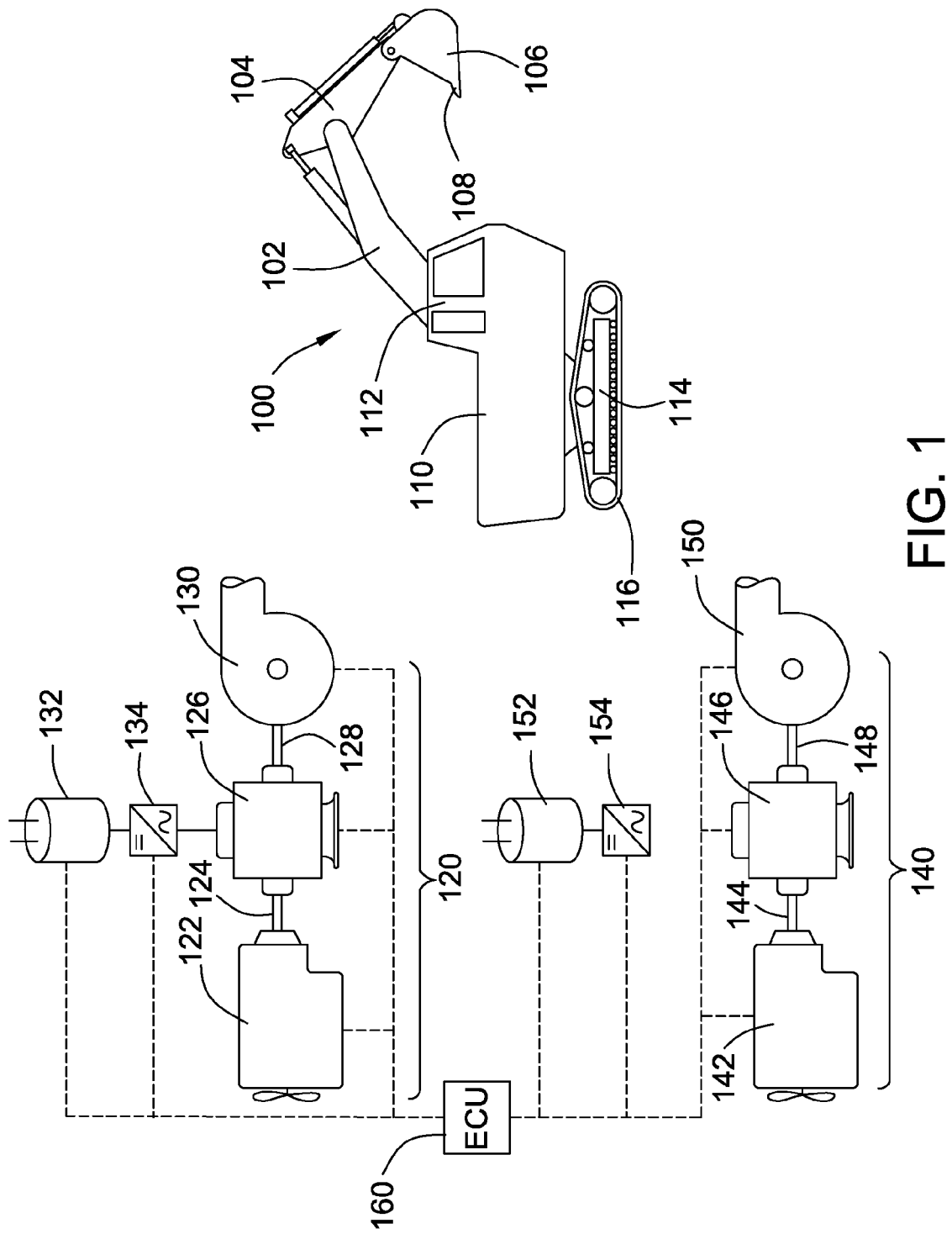
FIG. 1 is a schematic representation of a machine in the embodiment of an excavator having a first powertrain and a second powertrain, removed from the machine for illustration, each of which includes an internal combustion engine and a motor-generator coupled in series and arranged as a hybrid system in accordance with the disclosure.

This disclosure relates to one or more powertrains configured to recover and reuse the kinetic energy generated by a prime mover to assist in operation of a machine. Referring to FIG. 1, wherein like reference numbers refer to like elements, there is illustrated an embodiment of a machine 100 in accordance with the disclosure that specifically is in the form of an excavator used for excavating and moving earth or other materials about a worksite. However, the disclosure may have broader applicability in various other types of machines as well. The term "machine" as used herein may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

To interface with the work materials, the machine 100 includes an elongated boom 102 that at one end is pivotally connected to a similarly elongated dipper or stick 104 such that the two components form an articulating joint with each other. An opened mouthed bucket can be joined by a hinge at an opposite end of the stick 104 that is configured for scooping and holding the material. The bucket 106 may have a straight cutting edge 108 opposite the hinged connection that includes a plurality of protruding teeth. The end of the boom 102 opposite the stick 104 is pivotally supported by and can articulate with respect to an upper structure 110 of the machine 100. The pivotal connections between the boom 102, stick 104, and bucket 106 enable the operator to lift, lower and otherwise maneuver the bucket with respect to the work material. To forcibly articulate or actuate the pivotally linked components, the boom 102, stick 104, and bucket 106 may be operatively associated with one or more telescoping hydraulic cylinders forming part of the hydraulic system of the machine 100.

To accommodate the operator, the upper structure 110 can include an operator's cab 112 disposed in a position providing visibility about the worksite and inside of which various machine motion controls, power plant controls, gauges, and readouts are located. The upper structure 110 can also accommodate the components of the power system, hydraulic system, and other systems associated with the machine. These systems also provide the upper structure 110 with additional mass or counterweight to balance the digging and lifting operations of the boom 102, stick 104, and bucket 106. To further facilitate digging and loading operations, the upper structure 110 of the machine 100 can be pivotally mounted on an undercarriage 114 such that the upper structure can swing the boom 102 and stick 104 horizontally around for loading or dumping loads from the bucket 106. To propel the machine 100 over the ground or surface of the worksite, the undercarriage 114 can be equipped with a plurality of continuous tracks 116; however, in other embodiments, the machine may utilize solid or pneumatic wheels or other propulsion devices.

As can be appreciated from the foregoing, the machine 100 can perform several different operations. Some operations may be energy intensive, such as lifting and driving the bucket 106 through the work material. Other operations may require relatively less energy, such as propelling the machine about a worksite, but necessitates that the continuous tracks 116 or other propulsion devices operate at significant speeds. The machine 100 may readily switch between such energy or speed intensive operations.

To generate energy to propel the machine 100 and operate its associated equipment, a powertrain 120 can be included that, in FIG. 1, is illustrated as removed from the upper structure 110. In accordance with the disclosure, the powertrain 120 is configured as a diesel- or gas-electric hybrid system that can utilize both hydrocarbon-based fuels and electric power. To combust hydrocarbon fuels, the powertrain 120 includes a prime mover in the form of an internal combustion engine 122 such as a diesel-burning, compression ignition engine, although other engine configurations can be utilized with the disclosed powertrain. The internal combustion engine 122 burns fuel and converts the chemical energy therein into kinetic or mechanical force, specifically torque measured in foot-pounds or newton-meters, that is transferred from the engine by a rotating output or driveshaft 124. The rotational speed of the driveshaft 124 can be measured in revolutions per minute (RPM).

To provide the electrical component of the hybrid powertrain 120, a motor-generator 126 is operatively connected in series with the driveshaft 124 from the internal combustion engine 122. The motor-generator 126 can be an electromechanical device that is capable of operating as either a motor converting electricity to kinetic or mechanical energy or conversely as a generator converting mechanical energy into electricity. The motor-generator typically includes a rotator made of coils, windings or the like that is rotatably disposed in a stationary stator of similar electrical construction by, for example, ball bearings. Relative motion of the rotator and stator and the interaction of electromagnetic forces carried by those components can alternatively generate an electrical charge or mechanical rotation. To mechanically couple with other components, the motor-generator 126 can include an output shaft 128 protruding from the opposite side that is coupled to the driveshaft 124. The motor-generator 126 can operate on either alternating current (AC) or direct current (DC), though alternating current may be more practicable for the intended application.

The powertrain 120 may be coupled to a powertrain load associated with the machine that utilizes the output of the powertrain. For example, in an embodiment, the functions of the machine 100 may be primarily hydraulically actuated including the lifting, swinging, and propulsion functions. Accordingly, the powertrain 120 may be operatively associated with a hydraulic system and may be used to operate one or more hydraulic pumps 130. The hydraulic pump 130 is coupled to the output shaft 128 from the motor-generator and can generate hydraulic pressure that causes a hydraulic fluid to flow within the hydraulic system. Hoses or conduits can direct the hydraulic fluid to different actuators disposed about the machine and associated with the hydro-mechanical components of the machine. In other embodiments, however, the output shaft 128 may be physically linked to other components such as the continuous tracks 116 to power their operation directly with the generated torque output.

As indicated above, under certain operating conditions, the motor-generator 126 may operate as a generator generating electric power or energy from the kinetic energy input from the internal combustion engine 122. To temporarily store the electrical energy as potential energy for future use, the motor-generator 126 may be operatively associated with an energy storage device 132. The energy storage device 132 may be a capacitor or rechargeable battery electrically coupled to the motor-generator by conductive wiring or the like. As known to those of skill in the art, a capacitor can store electric energy in an electric field while a battery can store chemical potential energy. Because both types of energy storage operate on DC power, and the motor-generator 126 typically generates AC power, an inverter gate 134 can be disposed between the motor-generator 126 and the energy storage device 132. The inverter gate 134 can convert the energy between DC power and AC power and may be electronic or electromechanical in configuration. In addition to converting between power types, the inverter gate 134 may function as a directional switch between the motor-generator 126 and the energy storage device 132 and can selectively direct the flow of energy between the two components.

In a particular further embodiment of the disclosure, the machine 100 may include a second powertrain 140 similar in configuration to the first powertrain 120 and illustrated schematically below the first powertrain. Accordingly, the second powertrain 140 can include a second internal combustion engine 142 physically coupled in series to a second motor-generator 146 via a driveshaft 144 with the second motor-generator coupled in series to a second hydraulic pump 150 via an output shaft 148. To enable the second powertrain 140 to operate as a hybrid system, the second power train can also be operatively associated with an energy storage device 152 that is electrically coupled to the second motor-generator 146. To selectively switch the direction of energy flow between the second motor-generator 146 and the second energy storage device 152, a second inverter gate 154 can be disposed between the components. The first and second powertrains 120, 140 can be physically arranged in parallel with each other on the machine 100 and can share the task of providing power for the various systems and functions of the machine. In various embodiments, the size and performance characteristics of the first and second internal combustion engines, and thus the first and second powertrains, may be the same or different and each may operate at different power or speed requirements as explained below.

To coordinate and control the various components in the first and second powertrains 120, 140, the machine 100 may include an electronic or computerized control unit, module or controller 160. The controller 160 may be adapted to monitor various operating parameters and to responsively regulate various variables and functions affecting the powertrain. The controller 160 may include a microprocessor, an application specific integrated circuit (ASIC), or other appropriate circuitry and may have memory or other data storage capabilities. Although in FIG. 2, the controller 160 is illustrated as a single, discrete unit, in other embodiments, the controller and its functions may be distributed among a plurality of distinct and separate components. To receive operating parameters and send control commands or instructions, the controller 160 may be operatively associated with and may communicate with various sensors and controls associated with the various components in the powertrains 120, 140. Communication between the controller 160 and the sensors and controls may be established by sending and receiving digital or analog signals across electronic communication lines or communication busses. The various communication and command channels are indicated in dashed lines for illustration purposes with the controller 160 specifically communicating with the internal combustion engines 122, 142, the motor-generators 126, 146, the energy storage devices 132, 152, and the inverter gates 134, 154. In addition, the controller 160 can communicate with the other components and systems on the machine 100 and even interface with an operator in the operator's cab 112.

Figure 2:
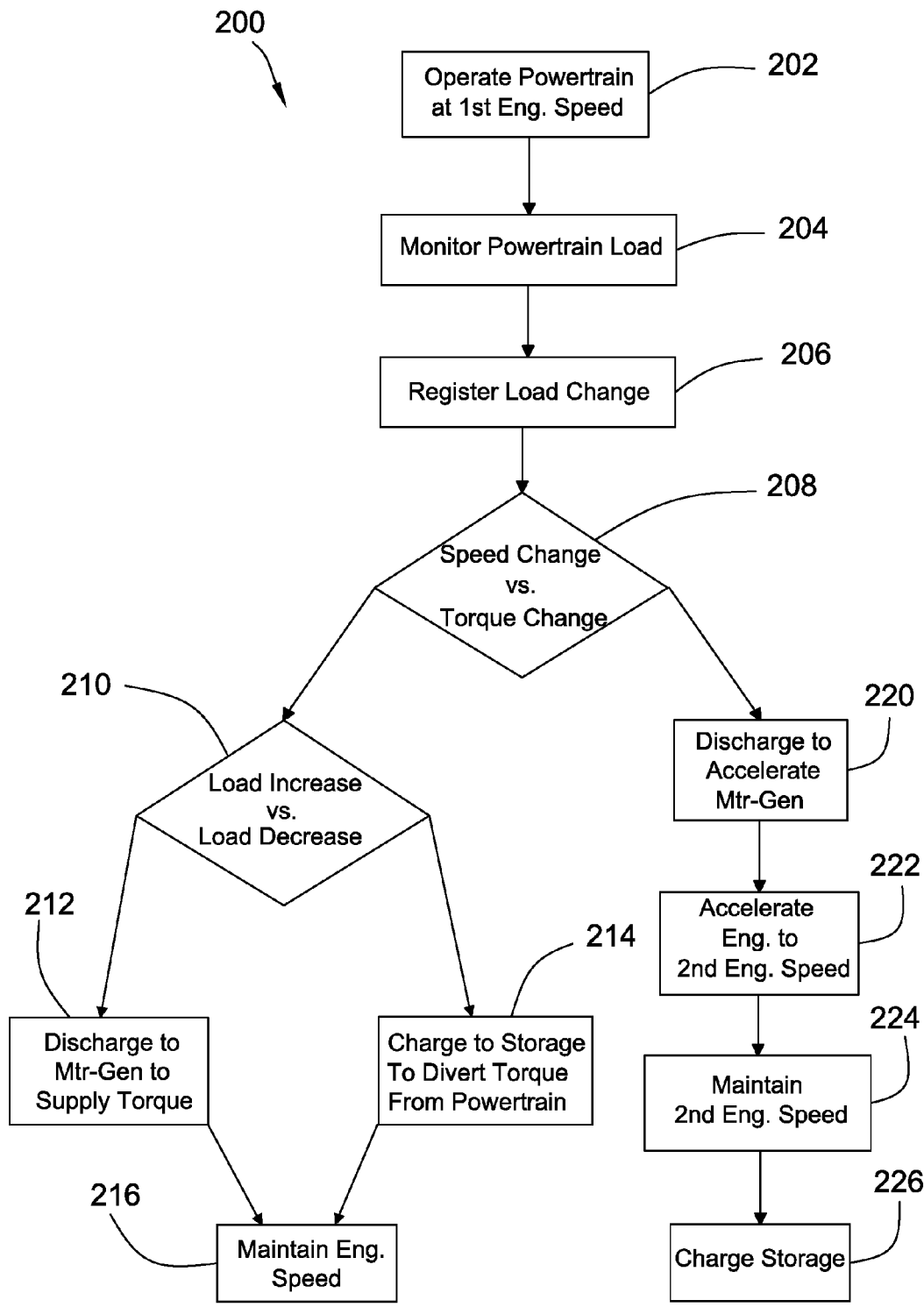
FIG. 2 is a flowchart representing a regulating process that may be utilized to regulate the torque and speed produced in the first and/or second powertrains in accordance with an aspect of the disclosure.

Referring to FIG. 2, there is illustrated a flowchart of a possible routine or process 200 for regulating the transmission of torque and/or speed, i.e., kinetic energy, through either or both of the first and second powertrains as the machine proceeds through various maneuvers, some which may require increased power output and others which may require prompt speed response. The controller associated with the machine can be configured to conduct the regulating process by execution of stored software. By way of example, the regulating process 200 may begin with an initial engine speed step 202 in which the internal combustion engine operates at a first engine speed. In machines of the foregoing type, it may be desirable to maintain operation of the internal combustion engine at a constant speed or within a relatively small speed band to improve efficiency and simplify operation of the associated hydraulic system. Accordingly, during the initial engine speed step 202, the regulating process 200 can attempt to maintain a consistent speed of the internal combustion engine. In a monitoring step 204, the regulating process 200 monitors the powertrain load on the powertrain that can include any digging, lifting, propulsion, or swing operations the machine may be undertaking. The monitoring step 204 can be accomplished by sensing pressure feedback on the hydraulic system, transmission loads, operator requests and similar variables.

In a registration step 206, the regulating process 200 can register a change in the powertrain load applied to or requested of the powertrain. To determine the status of the registered load change, the regulating process can conduct a load determination step 208 in which the process decides if the registered load change represents a change in the request torque output of the machine (i.e. a torque change condition) or a change in the requested speed output (i.e. speed change condition) of the machine. The torque change condition and speed change condition can be associated with different maneuvers performed by the machine. The load determination step 208 can be based upon information received from sensors associated with the different machine systems communicating variables associated with or representative of the different operations to the controller.

If, for example, and with reference to FIGS. 1 and 2, the load determination step 208 determines the registered load change represents a request for a change in the torque output, the regulating process 200 can conduct a subsequent torque determination step 210 that determines if the torque output request represents a request for increased torque output (i.e. torque increase condition) or decreased torque output (i.e. decreased torque condition) of the first powertrain 120. For instance, if the machine 100 is conducting a load intensive operation such as digging into or lifting material, it will be appreciated the powertrain 120 needs to quickly increase torque output to provide the required kinetic energy and power for the operation. However, if the machine 100 is performing a braking operation or low power intensity operation such as lowering the bucket, the torque output required of the powertrain 120 correspondingly decreases. The regulating process 200 consequently operates the powertrain in accordance with the outcome of the torque determination step 210.

For example, if the torque determination step 210 determines a torque increase is required, the regulating process 200 can regulate the flow of energy in the hybrid powertrain 120 to assist in providing addition energy. More specifically, as load increases on the powertrain 120, the internal combustion engine 122 will tend to lug or slow down to maintain performance. Lugging the internal combustion engine 122 may have adverse consequences for the internal combustion engine such as increased wear or overheating. To address this, the process 200 can perform a discharge step 212 in which the stored potential energy in the energy storage device 132 is directed back to the powertrain 120. Specifically, the inverter gate 134 operates to discharge stored potential energy in the form of electricity from the energy storage device 132 to the motor-generator 126 where the electricity is converted to kinetic energy in the form of rotational torque. The torque is transmitted from the motor-generator 126 to the internal combustion engine 122 to assist the engine and prevent lugging or unintentional slowing.

In the alternative, if the torque determination step 210 determines that the powertrain 120 has excess torque for the applied load, i.e., the machine 100 is performing a low intensity operation; the regulating process 200 can operate the powertrain to reduce the torque as part of a torque decrease condition. For example, if machine 100 is attempting to brake or slow down, the momentum of the machine may be directed back through the powertrain causing an overspeed condition to occur in the internal combustion engine 122 running the engine faster than intended. The overspeed condition may similarly result in wear and overheating. To address the overspeed condition, the regulating process 200 can conduct a charge step 214 that utilizes the motor-generator 126 to charge the energy storage device 132, specifically, by converting the excess torque being transmitted in the motor-generator into electrical energy. The inverter gate 134 operates to direct the electrical energy to the energy storage device 132 for storage as potential energy. The charging step 214 effectively applies an additional torque load to the internal combustion engine that directs or removes kinetic energy from the powertrain 120 for future use, for example, in a subsequent discharge step 212.

Figure 3:
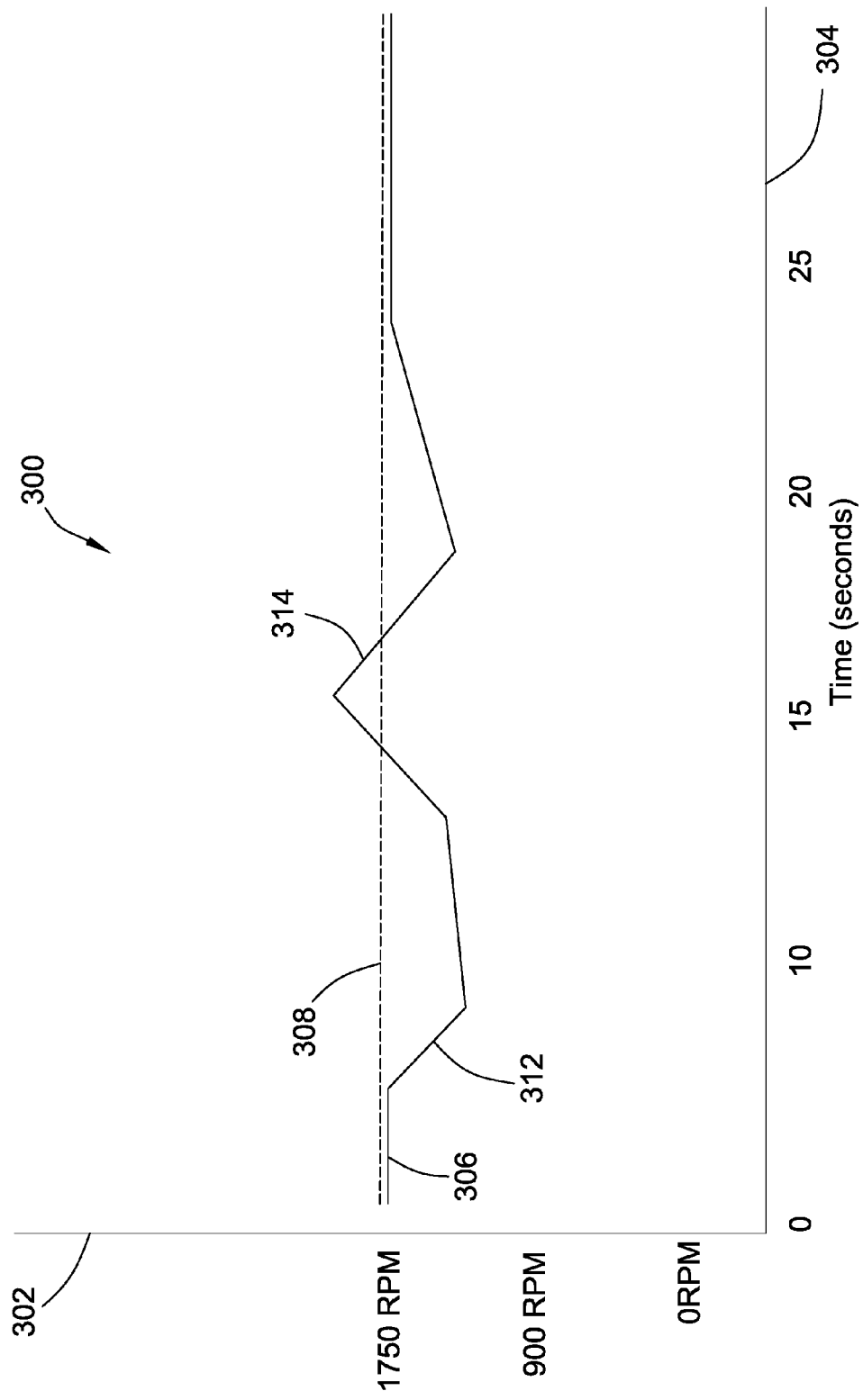
FIG. 3 is a chart representing engine speed verses timing to graph the performance of the powertrain when the regulating process attempts to change the output torque while maintaining the speed of the internal combustion engine.

A result of this aspect of the regulating process 200 maintains the engine speed of the internal combustion engine with a degree of consistency during load changes as part of a maintain engine speed step 216 of the process. Referring to FIG. 3, a chart 300 illustrates performance of the powertrain 120 with and without assistance of the interaction between the motor-generator 126 and energy storage device 132. In FIG. 3, the Y-axis 302 represents the actual engine speed of the internal combustion engine 122 in revolutions per minute (RPM), the X-axis 304 represents time in seconds, the first curve 306 represents operation of the engine without energy recovery and the second curve 308 represents operation with energy recovery. In accordance with the regulating process 200, the internal combustion engine 122 may initially operate at a consistent speed during the initial engine speed step 202, as indicated by the horizontal overlap of the first and second curves 306, 308. However, if the torque demand on the powertrain 120 increases, it could lug or slow the internal combustion engine down as indicated by the speed dip 312 in the first curve 306. Likewise, if the torque demanded of the powertrain 120 drops, the internal combustion engine 122 may go into an overspeed condition as indicated by the speed rise 314 in the first curve. With the regulating process 200, by introducing additional torque into the powertrain 120 through the discharge step 212 or by removing torque from the powertrain through the charge step 214, the internal combustion engine maintains a consistent engine speed as indicated by the second curve 308.

In another aspect, if the load determination step 208 determines the registered load change indicates a requested change in the speed output of the powertrain 120, i.e., the speed change condition, the regulating process 200 can assist the powertrain in increasing engine speed. Specifically, in a second discharge step 220, the inverter gate 134 may operate to discharge electrical energy from the energy storage device 132 to the motor-generator 126 that converts the electrical energy to kinetic energy in a manner that increases or accelerates the speed of the motor-generator. Relatedly, this increases or accelerates the engine speed of the internal combustion engine 122 to a second engine speed in an accelerate engine speed step 222. Once accelerated, the internal combustion engine 122 can be maintained at the second engine speed in a second maintain engine speed step 224, thereby effectively raising the speed of the powertrain 120. During the second maintain engine speed step 224, while the internal combustion engine is operating in a steady state manner at the consistent second engine speed, the regulating process 200 can operate the inverter gate 134 to divert a portion of the electric power in the motor-generator 126 to charge the energy storage device 132 in a second charge step 226 thereby recovering energy for future use.

Figure 4:
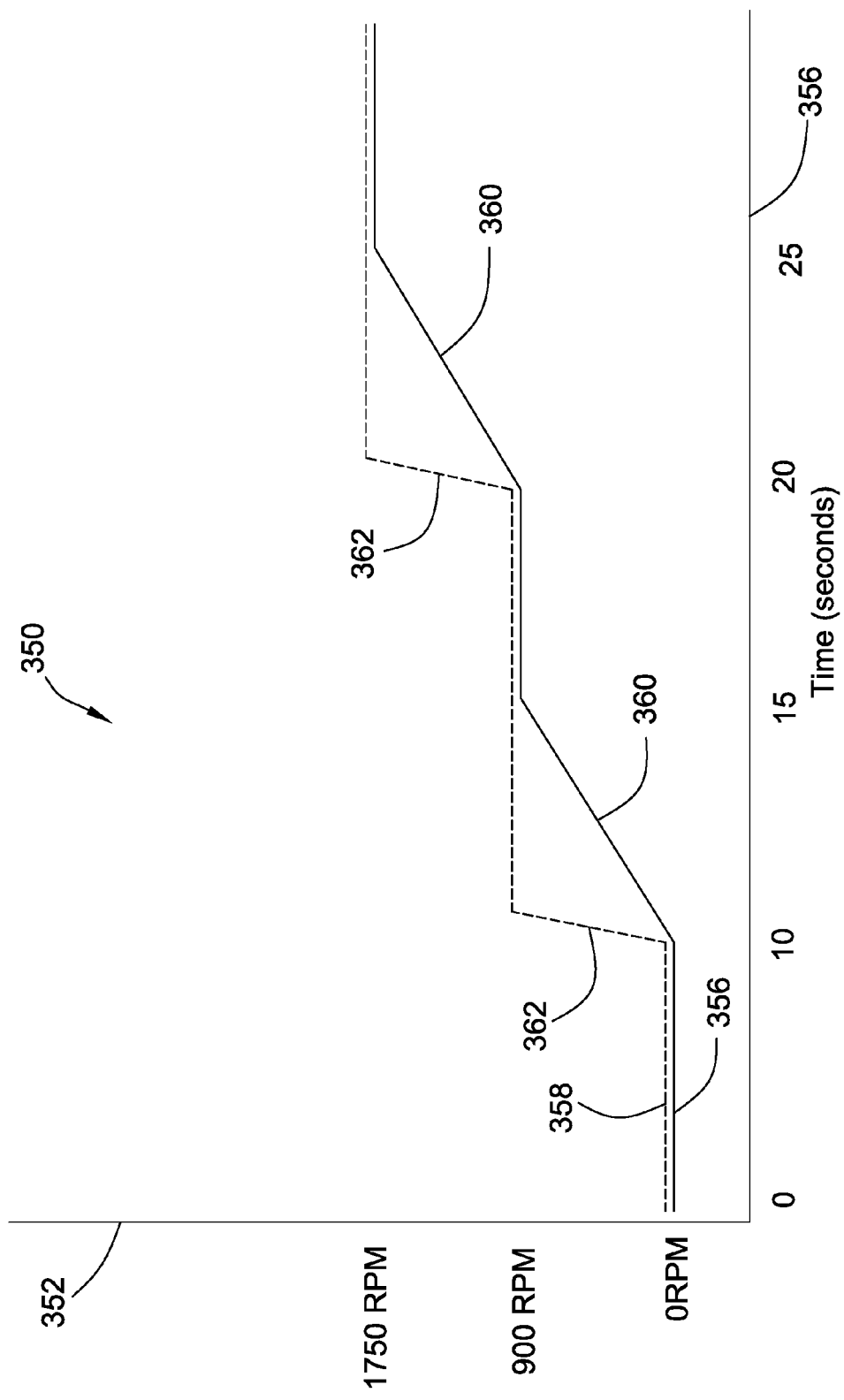
FIG. 4 is a chart representing engine speed verses timing to graph the performance of the powertrain when the regulating process attempts to assist increasing speed of the internal combustion engine.

The effect of assisting the internal combustion engine 122 during speed change conditions can be seen in FIG. 4, which is a chart 350 similar to FIG. 3 illustrating operation of the internal combustion engine with and without assistance from the motor-generator 132. In FIG. 4, the Y-axis 352 represents engine speed in RPM and the X-axis 354 represents time in seconds. The first curve 356 shows response time of the internal combustion engine 122 without assistance from the motor-generator 126 while second curve 358 depicts response time with such assistance. The first curve 356 is denoted by periods of delay indicated by the moderate slope 360 at the times the first curve 356 rises in speed. The second curve 358 in contrast depicts much sharper slopes 362 during these engine speed increases, reflecting the assistance provided by discharging electrical energy from the energy storage device 132 to the motor-generator 126.

Figure 5:
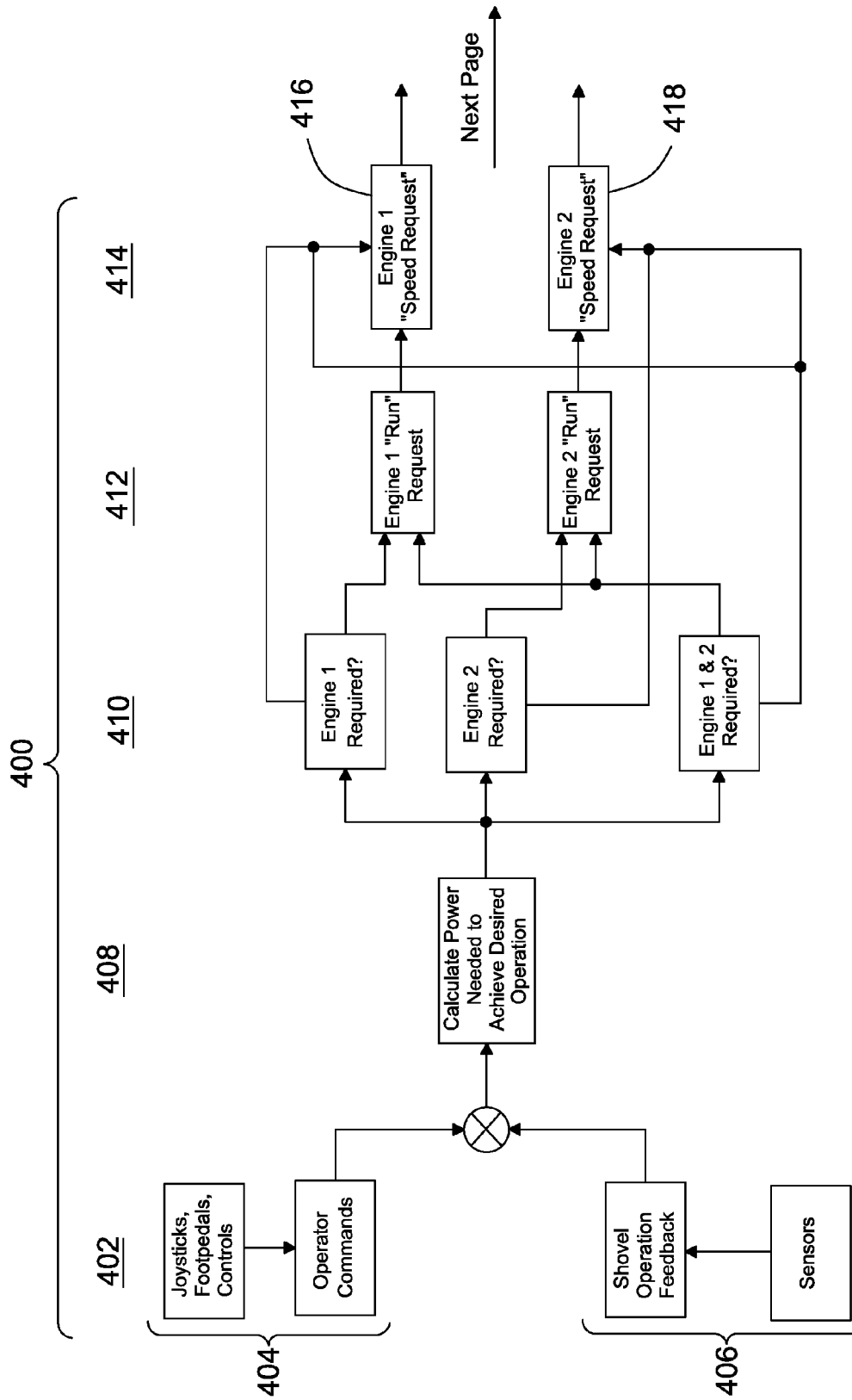
FIG. 5 is a schematic block diagram representing a regulating process for parallel operation of the first and second powertrains in accordance with another aspect of the disclosure.
Figure 5:
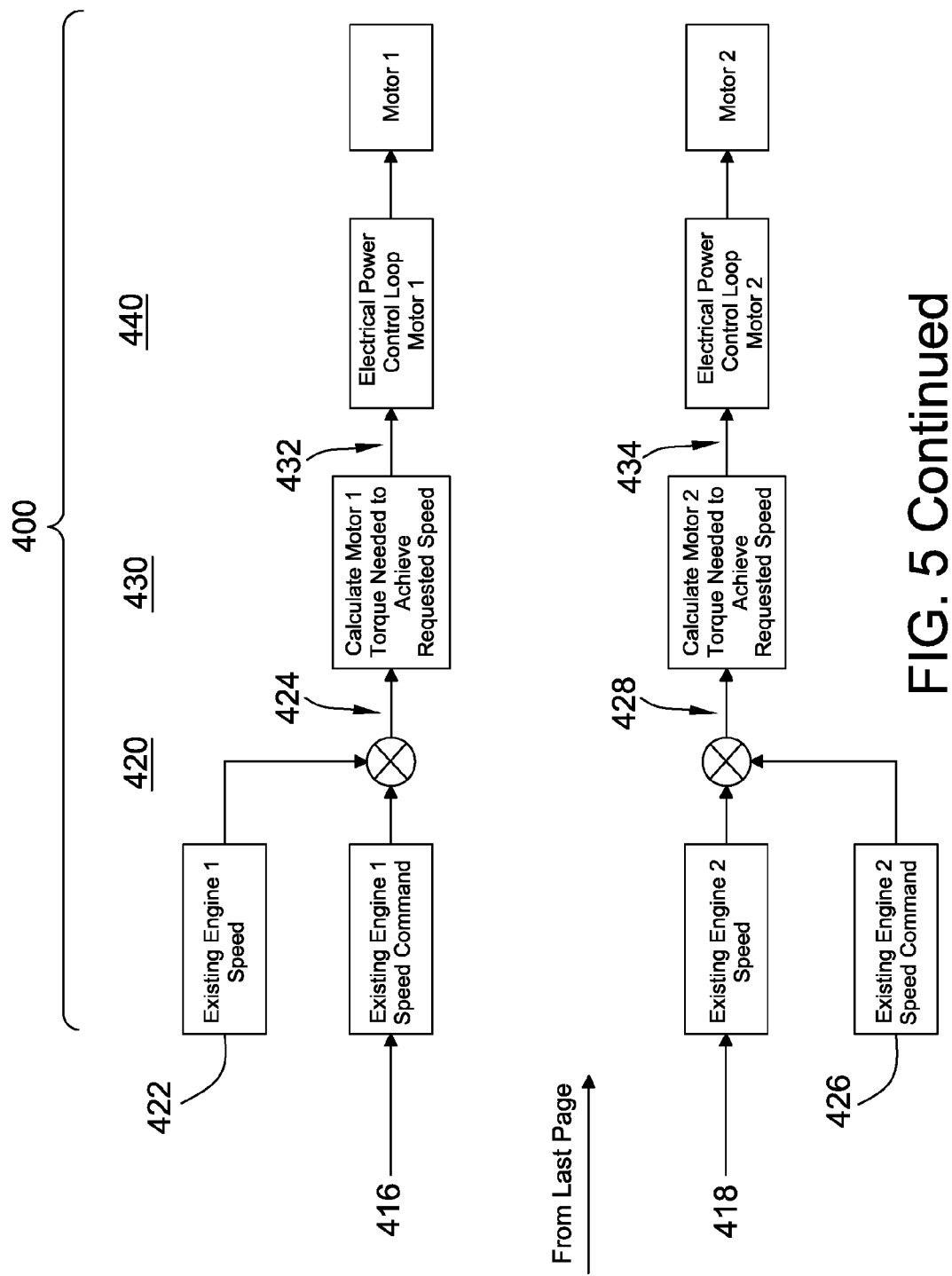

Referring to FIG. 2 and FIG. 5, there is illustrated another embodiment of a regulating process 400 in the form of a block diagram for regulating operation of those embodiments of the machine 100 having first and second powertrains 120, 140 operating in parallel. Similar to the process described in FIG. 2, the regulating process 400 can be executed by the controller associated with the machine in conjunction with the information obtained through sensors, controls and the like. In an initial series of monitoring operations 402, the regulating process 400 can obtain or receive operator commands 404 or inputs regarding requested speed or torque and performance information 406 or feedback such as hydraulic pressures, flows, combusting efficiency etc. The regulating process 400 can use the operator commands 404 and performance information 406 to perform power calculations 408 that calculate the total machine power required to achieve the desired operation of the machine. The power calculations 408 may additionally use anticipatory performance variables or predicative routines to anticipate future machine power requirements.

In a subsequent series of operations, the regulating process 400 can divide the total machine power requirements determined by the power calculations 408 between the first and second powertrains 120, 140 on the machine 100. For example, in an engine determination step 410, the process can decide whether output from the first internal combustion engine 122, the second internal combustion engine 142, or both are desired or necessary to provide the calculated total machine power requirements. Some operations may require the energy output from only one powertrain verses both, while other operations may be better performed by one powertrain verses the other due to the specific equipment or characteristics associated with the particular powertrain. The regulating process 400 can also execute a speed determination step 412 that determines the engine speed request required of the first and second internal combustion engines 122, 142 in each of the powertrains 120, 140 to meet the machine power requirements calculated by the power calculations 408. In a request transmission step 414, the regulating process 400 develops an electronically transmittable and executable first request signal 416 and second request signal 418 associated with each of the first and second powertrains 120, 140.

Because the first and second internal combustion engines 122, 142 may be currently operating when the power calculations 408 are performed, the determined first request signal 416 and second request signal 418 representing the total machine power requirements may not be appropriate. In other words, because the first and second internal combustion engines 122, 142 may be running at existing engine speeds when the request signals 416, 418 are received, the regulating process 400 can perform a discrepancy determination step 420 to calculate the discrepancy. In particular, the discrepancy determination step 420 can receive the first existing engine speed 422 associated with the first internal combustion engine 122 along with the first request signal 416 and utilize arithmetic to calculate a first discrepancy signal 424 reflecting the actual speed change required to meet the calculated total power requirements for the machine. Likewise, the discrepancy determination step 420 can receive a second existing engine speed 426 of the second internal combustion engine 142 with the second request signal 418 to calculate a second discrepancy signal 428. The first and second discrepancy signals may or may not be equal depending upon the relative operational conditions or performance of the first and second internal combustion engines 122, 142.

After the first and second discrepancy signals 424, 428 have been determined, the first and second powertrains 120, 140 can be operated accordingly. In the present embodiment, where the first and second powertrains 120, 140 include respective first and second motor-generators 126, 146 to assist operation of the first and second internal combustion engines 122, 142, the regulating process 400 can conduct a torque determination step 430 similar to the process described with respect to FIG. 2. For example, the torque determination step 430 may determine what the desired torque output of the respective first and second powertrains 120, 140 is, or in other words, what the kinematic energy transferred through the powertrains is needed. The torque determination step 430 can result in a first torque signal 432 and second torque signal 434, which may or may not be equal in quantity. The regulating process 400 utilizes the first and second torque signals 432, 434 to operate the respective powertrains 120, 140 appropriately. This may include determining whether to operate the first and second inverter gates 134, 154 to direct torque to or from the respective powertrains 120, 140 in an inverter control step 440. For example, the inverter control step 540 may dictate the direction of electricity flowing between the energy storage device 132, 152 and the motor-generators 126, 146 to charge or discharge the storage devices. The inverter control step 440 may operate the inverter gates 134, 154 independently with the first charge the energy storage device 132 and the second discharging the storage device 152 as appropriate of the respective first and second torque signals 432, 434.

INDUSTRIAL APPLICABILITY

The disclosure can assist in regulating torque and speed transmission in a powertrain 120 by utilizing a hybrid architecture to accommodate the different operations undertaken by the machine 100 such as an excavator. The powertrain 120 includes a motor-generator 126 physically disposed between an internal combustion engine 122 and a varying powertrain load produced by the machine 100. The motor-generator 126 is configured to convert kinetic energy in the form of rotational torque to storable electrical energy, i.e., potential energy, and vice versa. To store the electrical energy, the motor-generator 126 is electrically coupled to an energy storage device 132. To selectively charge electric energy to and discharge electrical energy from energy storage device 132, an inverter gate 134 is disposed between the storage device 132 and motor-generator 126.

The disclosure further provides a regulating process 200 to regulate operation of the powertrain during different operational conditions of the machine 100. For example, during energy intensive operations such as lifting or digging, the regulating process 200 attempts to maintain a consistent engine speed of the internal combustion engine 122 while accommodating the varying torque requirement in the powertrain 120. This can be accomplished by operating the inverter gate 134 to selectively charge energy to and discharge energy from the energy storage device 132. The energy storage device 132 and inverter gate 134 thus act as speed control device for the internal combustion engine 122. During speed intensive operations, the regulating process 200 regulates the powertrain 120 to assist in accelerating the internal combustion engine 122 also by selectively directing energy to and from the energy storage device 132.

In another aspect, the regulating process 400 can simultaneously regulate first and second powertrains 120, 140 arranged in parallel in a machine 100. The regulating process 400 can divide the total machine power requirements and independently operate first and second energy storage devices 132, 152 associated with the respective powertrains to produce torque or speed values having the same or different quantities depending on the total power requirements of the machine. These and other possible advantages of the disclosure should be apparent from the foregoing description and figures.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of regulating operation of a powertrain having an internal combustion engine, a motor-generator, and a powertrain load coupled in series, the method comprising:
    operating the internal combustion engine at a first engine speed;
    charging an energy storage device coupled to the motor-generator through an inverter gate disposed between the energy storage device and the motor-generator;
    registering a change in the powertrain load;
    determining if the change represents a torque change condition or a speed change condition;
    operating the inverter gate to maintain the first engine speed under the torque change condition; and
    operating the inverter gate to accelerate the internal combustion engine to a second engine speed under the speed change condition.

2. The method of claim 1, wherein the step of operating the inverter gate to maintain the first engine speed comprises:
    determining if the torque change condition represents a torque increase condition or a torque decrease condition.

3. The method of claim 2, further comprising discharging energy from the energy storage device through the inverter gate to the motor-generator to increase torque produced by the powertrain under the torque increase condition.

4. The method of claim 3, wherein increased torque produced in the powertrain prevents lugging of the internal combustion engine.

5. The method of claim 3, further comprising charging energy to the energy storage device from the motor-generator through the inverter gate to apply a torque load to the internal combustion engine under the torque decrease condition.

6. The method of claim 5, wherein applying the torque load to the internal combustion engine prevents an overspeed condition of the internal combustion engine.

7. The method of claim 1, wherein the step of operating the inverter gate to accelerate the internal combustion engine comprises discharging energy from the energy storage device to the motor-generator to achieve the second engine speed.

8. The method of claim 7, further comprising charging the energy storage device from the motor-generator through the inverter gate at the second engine speed.

9. A powertrain for a machine comprising:
    an internal combustion engine operable at a plurality of engine speeds;
    a motor-generator physically coupled in series to the internal combustion engine, the motor-generator capable of operating as either a motor or a generator;
    a powertrain load physically coupled in series to the motor-generator and the internal combustion engine;
    an energy storage device electrically coupled to the motor-generator through an inverter gate; and
    a controller communicating with the inverter gate, the controller programmed to register a change in the powertrain load and to determine if the change represents a torque change condition or a speed change condition, the controller further programmed to operate the inverter gate to maintain a first engine speed of the internal combustion engine under the torque change condition and to accelerate the internal combustion engine under the speed change condition.

10. The powertrain of claim 9, wherein the inverter gate discharges power from the energy storage device to the motor-generator during the torque change condition to increase torque transmitted in the powertrain.

11. The powertrain of claim 10, wherein the inverter gate charges power to the energy storage device from the motor-generator during the torque change condition to apply a torque load to the internal combustion engine.

12. The powertrain of claim 11, wherein the inverter gate discharges power from the energy storage device to the motor-generator during the speed change condition to accelerate the internal combustion engine to a second engine speed.

13. The powertrain of claim 12, wherein the inverter gate charges power to the energy storage device from the motor-generator once the internal combustion engine is at the second engine speed.

14. The powertrain of claim 9, wherein the energy storage device is selected from a group consisting of a capacitor and a battery.

15. The powertrain of claim 9, wherein the powertrain load is a hydraulic pump.

* * * * *